United States Patent
Mahdavipour et al.

(10) Patent No.: US 11,843,627 B2
(45) Date of Patent: Dec. 12, 2023

(54) AUTOMATED PEN TEST AS A CODE FOR CLOUD

(71) Applicants: Farshid Mahdavipour, Escondido, CA (US); Karthik Ramamoorthy, Escondido, CA (US)

(72) Inventors: Farshid Mahdavipour, Escondido, CA (US); Karthik Ramamoorthy, Escondido, CA (US)

(*) Notice: Subject to any disclaimer, the term of this patent is extended or adjusted under 35 U.S.C. 154(b) by 81 days.

(21) Appl. No.: 17/388,020

(22) Filed: Jul. 29, 2021

(65) Prior Publication Data

US 2023/0031218 A1    Feb. 2, 2023

(51) Int. Cl.
*H04L 9/40* (2022.01)
*H04L 67/10* (2022.01)

(52) U.S. Cl.
CPC ......... *H04L 63/1433* (2013.01); *H04L 67/10* (2013.01)

(58) Field of Classification Search
None
See application file for complete search history.

(56) References Cited

U.S. PATENT DOCUMENTS

| | | | |
|---|---|---|---|
| 11,394,740 B1* | 7/2022 | Shake | G06N 20/00 |
| 2017/0244745 A1* | 8/2017 | Key | H04L 63/1433 |
| 2018/0069948 A1* | 3/2018 | Blank | H04L 41/5009 |
| 2018/0239902 A1* | 8/2018 | Godard | G06F 21/53 |
| 2019/0245883 A1* | 8/2019 | Gorodissky | H04L 63/1433 |
| 2022/0060499 A1* | 2/2022 | Huda | H04L 63/1416 |
| 2022/0247775 A1* | 8/2022 | Shake | H04L 43/045 |
| 2022/0294818 A1* | 9/2022 | Parekh | G06F 21/602 |
| 2023/0004445 A1* | 1/2023 | Bosch | G06F 21/562 |

FOREIGN PATENT DOCUMENTS

WO    WO-2012170423 A1 * 12/2012    ........... G06F 21/552

* cited by examiner

*Primary Examiner* — Kaveh Abrishamkar

(57) ABSTRACT

Disclosed below is a system and method for automated penetration testing for cloud. The system and method comprises extracting metadata from the cloud, using the metadata to identify parameters and targets for penetration testing, receiving inputs related to penetration testing from a user and generating a configuration file for penetration testing as a code. Further, it comprises performing penetration testing automatically and remotely, without pentesters, based on the generated configuration file.

20 Claims, 3 Drawing Sheets

AUTOMATED PEN TEST AS A CODE FOR CLOUD

TECHNICAL FIELD

Various embodiments are directed to systems and methods to perform penetration testing. More particularly and specifically, the present disclosure relates to the system and methods for automated penetration testing to assess the security and detect vulnerabilities in cloud.

BACKGROUND

The identification and correction of security vulnerabilities is a large area of research and investigation in information security. In particular, many resources are expended to protect the data and services that are hosted by cloud services and network-connected information providers. Various approaches are currently used to identify security vulnerabilities and issues in network-accessible software applications and services.

Typically, organizations hire external hackers and internal hackers to check and look for any potential threats. But this process is very expensive and time consuming. Further, this requires the hacker to be physically present in the organization.

There exist multiple solutions as well for automated penetration testing. These solutions primarily focus on the user to create and configure the testing environment and all the possible scenarios. It may be tricky since the user may miss out on a few potential security issues. Further, another problem with these solutions is the need for the configuration to be done. Customers or the users are typically responsible Cloud resource configuration and less than 10% of users are capable of identifying & fixing all the cloud security misconfigurations. Furthermore, Numerous security configuration issues across IAAS/PAAS/SAAS services to allow data breaches and data exfiltration.

In light of the above-mentioned shortcomings associated with penetration testing methods and systems, it is highly desirable to have a system which automatically help users to automatically configure the pen test, generate the configuration file, perform penetration testing and generate the report with minimal intervention from a user.

SUMMARY

Embodiments of the present disclosure present technological improvements as solutions to one or more of the above-mentioned technical problems recognized by the inventor in conventional systems.

The present invention discloses a system and method for automated penetration testing, comprising a processor communicably coupled a memory device, wherein the processor is configured to receive inputs from the users pertaining to the penetration testing, extract metadata from a cloud on which the penetration testing is to be done, based on the metadata, identify all the required information such as the network, APIs used, authentication factors, etc., and generate a configuration file for penetration testing. In the preferred embodiment of the same invention, the processor is further configured to perform penetration testing and generate a penetration test report.

Additionally, in an aspect of the present invention, the configuration file generated by the system and methods is a software code. Additionally, a user may also be able to change/modify the configuration file as well, based on their specific requirements.

One of the embodiments of the present disclosure provides a system for automated penetration testing for a cloud, the system comprising a processor; a memory containing executable non-transitory machine-readable instructions configured to instruct the processor to receive, from a user, one or more inputs pertaining to a target cloud environment for a penetration testing; extract a cloud metadata pertaining to the target cloud environment; identify, based on the extracted cloud metadata, at least one or more networks, one or more APIs, one or more services and one or more authentication factors corresponding to the target cloud environment, remotely; receive, from the user, one or more inputs pertaining to a type of connection to be used; receive, from the user, one or more inputs pertaining to a type of the penetration testing to be done; receive, from the user, one or more inputs pertaining to a service for which the penetration testing to be done; and generate a configuration file for the penetration testing.

In another aspect, the same disclosure teaches a method for automated penetration testing for a cloud, the method comprising a plurality of electronic operations executed by a processor and a memory, the plurality of electronic operations including receiving one or more inputs from a user pertaining to a target cloud environment for a penetration testing; extracting a cloud metadata pertaining to the target cloud environment; identifying at least one or more networks, one or more APIs, one or more services and one or more authentication factors corresponding to the target cloud environment using the extracted cloud metadata, remotely; receiving one or more inputs from the user pertaining to a type of connection to be used; receiving one or more inputs from the user pertaining to a type of the penetration testing to be done; receiving one or more inputs from the user pertaining to a service for which the penetration testing to be done; and generating a configuration file for the penetration testing.

Beneficially, the present invention provides a system and method for automated penetration testing wherein user inputs and/or interactions is minimal and the configuration file is automatically generated. Further, the present disclosure is compatible with any type of cloud environment.

Additional aspects, advantages, features and objects of the present disclosure would be made apparent from the drawings and the detailed description of the illustrative embodiments construed in conjunction with the appended claims that follow.

It will be appreciated that features of the present disclosure are susceptible to being combined in various combinations without departing from the scope of the present disclosure as defined by the appended claims.

While the systems and methods are illustrated by use of smart phone mobile device embodiments and applications, they are equally applicable to virtually any personal computer or portable or mobile communication device, including for example, a desktop computer, laptop computers, tablet, and virtual reality headset.

BRIEF DESCRIPTION OF DRAWINGS

The summary above, as well as the following detailed description of illustrative embodiments are better understood when read in conjunction with the appended drawings. For the purpose of illustrating the present disclosure, exemplary constructions of the disclosure are shown in the drawings. However, the present disclosure is not limited to specific methods and instrumentalities disclosed herein. Moreover, those in the art will understand that the drawings are not to scale. Wherever possible, like elements have been indicated by identical numbers.

Embodiments of the present disclosure will now be described, by way of example only, with reference to the following diagrams wherein.

In the accompanying drawings, an underlined number is employed to represent a material over which the underlined number is positioned or a material to which the underlined number is adjacent. A non-underlined number relates to a material identified by a line linking the non-underlined number to the material. When a number is non-underlined and accompanied by an associated arrow, the nonunderlined number is used to identify a general material at which the arrow is pointing.

DETAILED DESCRIPTION OF EMBODIMENTS

The following detailed description illustrates embodiments of the present disclosure and ways in which they can be implemented. Although some modes of carrying out the present disclosure have been disclosed, those skilled in the art would recognize that other embodiments for carrying out or practicing the present disclosure are also possible.

The present invention discloses a system and method for automated penetration testing for cloud. Disclosed system and methods enables a pentester free penetration testing to be done, by automatically generating a configuration file as a software code based on the cloud metadata and a few inputs from a user. Additionally, the system and methods perform the penetration testing based on the configuration file and generate a penetration testing report, highlighting network security risks, if any.

In a primary embodiment of the present invention, the system and method enables a processor to remotely extract metadata from the cloud on which the penetration test is to be done and remotely identify at least one or more networks, one or more APIs, one or more services and one or more authentication factors corresponding to the target cloud environment using the extracted cloud metadata.

In an embodiment of the present invention, the system and method further enables the processor to receive inputs from the user via a graphical user interface, wherein the inputs are basic information needed for penetration testing including but not limited to network configuration, security authentication, the service, the type of penetration testing. This information and the extracted meta data is used by the systems and methods to generate a configuration file, automatically.

Figure 1:
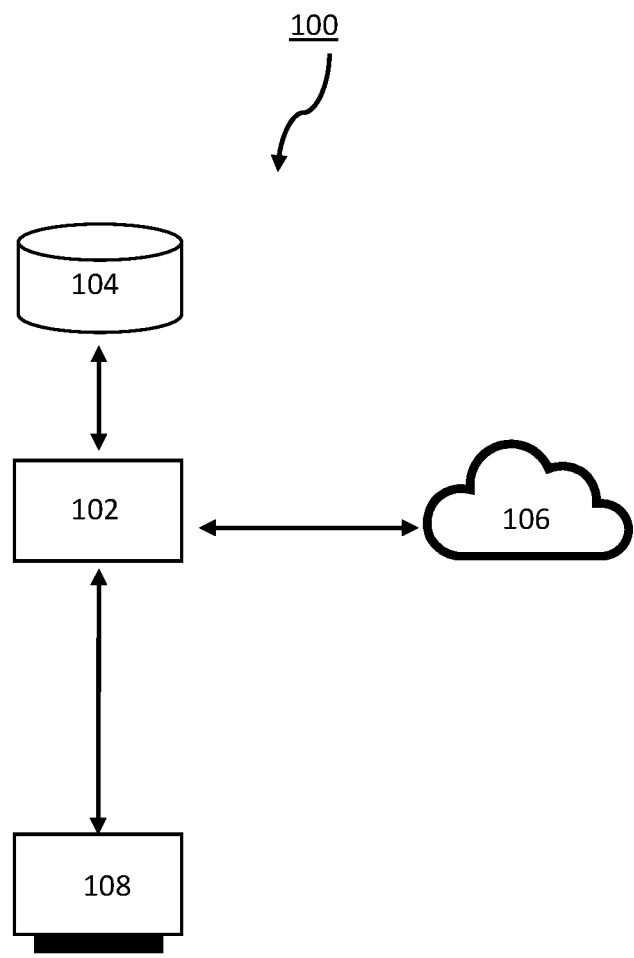
FIG. 1 is a schematic illustration of the system for automated penetration testing, in accordance with an embodiment of the present disclosure.

FIG. 1 is a schematic illustration of an exemplary embodiment of the automated penetration testing system for a cloud 100, wherein the system comprises a processor 102 communicably coupled via a communication network with a memory device 104, a cloud for penetration testing 106 and a graphical user interface 108.

The processor 102 is the core and soul of the system and the a memory device 104 contains executable non-transitory machine-readable instructions configured to instruct the processor 102 to receive from a user via the graphical user interface 108, one or more inputs pertaining to a target cloud environment for a penetration testing. Based on these one or more inputs from the user, the processor 102 identifies the cloud 106 for penetration testing. The processor 102 is further configured to extract a cloud metadata pertaining to the cloud 106, automatically. The processor is also configured to identify at least one or more networks, one or more APIs, one or more services and one or more authentication factors corresponding to the cloud 106, remotely and automatically. The processor 102 is further configured to receive from the user via the graphical user interface 108 including but not limited to, one or more inputs pertaining to a type of connection to be used and one or more inputs pertaining to a type of the penetration testing to be done, one or more inputs pertaining to a service for which the penetration testing to be done. Furthermore, the processor 102 is configured to generate a configuration file for the penetration testing based on the user inputs and cloud metadata. This generated configuration file is in the form of software code.

One or more components of the invention are described as unit for the understanding of the specification. For example, a unit may include self-contained component in a hardware circuit comprising of logical gate, semiconductor device, integrated circuits or any other discrete component. The unit may also be a part of any software programme executed by any hardware entity for example processor. The implementation of unit as a software programme may include a set of logical instructions to be executed by a processor or any other hardware entity.

Additional or less units can be included without deviating from the novel art of this disclosure. In addition, each unit can include any number and combination of sub-units, and systems, implemented with any combination of hardware and/or software units.

Method steps of the invention may be performed by a processor 102 or a combination or one or more processors executing a program tangibly embodied on a computer-readable medium to perform functions of the invention by operating on input and generating output. Suitable processors include, by way of example, both general and special purpose microprocessors. Generally, the processor receives (reads) instructions and data from the memory device 110 (such as a read-only memory and/or a random-access memory) and writes (stores) instructions and data to the memory. Storage devices suitable for tangibly embodying computer program instructions and data include, for example, all forms of non-volatile memory, such as semiconductor memory devices, including EPROM, EEPROM, and flash memory devices; magnetic disks such as internal hard disks and removable disks; magneto-optical disks; CD-ROMs; USB Drives; Cloud. Any of the foregoing may be supplemented by, or incorporated in, specially-designed ASICs (application-specific integrated circuits) or FPGAs (Field-Programmable Gate Arrays). A computer can generally also receive (read) programs and data from, and write (store) programs and data to, a non-transitory computer-readable storage medium such as an internal disk (not shown) or a removable disk.

Throughout the disclosure, the graphical user interface 108 refers to any and all types of display devices including 108 but not limited to a graphical user interfaces part of other devices, such as a computer, a laptop, a mobile phone or any other similar devices. Alternatively, the graphical user interface may be replaced by any other type of input devices, to read and/or detect an input from the user and send the same to the processor 102.

In various embodiments of the present invention, the processor 102 is configured to receive, from the user, one or more inputs pertaining to a target cloud environment for a penetration testing via the graphical user interface 108. The target cloud is one or more of Azure Cloud, Amazon Web Services, Google Cloud Platform. Without limiting the scope of the invention, the disclosed system and method is compatible with and works efficiently for any type of cloud and cloud environment.

Each cloud has an associated metadata. In another embodiment of the present invention, the processor 102 is configured to extract the metadata pertaining to the target cloud environment. Further, the processor is configured to identify at least one or more networks, one or more APIs, one or more services and one or more authentication factors corresponding to the target cloud environment, from the cloud metadata remotely. Throughout this disclosure, the terms APIs, network, services relates to standard terminologies used in the software industry and are to be interpreted as the same.

In another embodiment of the present disclosure, the processor 102 is configured to receive, from the user via the graphical user interface 108, one or more inputs pertaining to a type of connection to be used. As an illustration, without limiting the scope of the invention, the type of connection to be used is one or more existing connection or one or more new connection. Based on the said input from the user, the processor 102 chooses an existing connection or a new connection. In case the user opts for a new connection, the processor 102 creates a new connection to be used for penetration testing.

In another embodiment of the same disclosure, the processor 102 is configured to receive, from the user via the graphical user interface 108, one or more inputs pertaining to a type of the penetration testing to be done. The type of penetration testing is either an external testing, also called as black box testing, or an internal testing, also called as grey box testing. Without limiting the scope of the invention, the system and methods are capable of performing other types of testing as well and the processor automatically generates the corresponding configuration file for the same.

In another embodiment of the present invention, the processor 102 is configured to receive, from the user via the graphical user interface 108, one or more inputs pertaining to a service for which the penetration testing to be done. The services relates to the type of cloud and the applications to be tested. A user can select the type of services or optionally, enter the service the user desires to be tested.

In an alternate embodiment of the same invention, the processor 102 is configured to receive, from the user via the graphical user interface 108, other inputs from the user for penetration testing, such as one or more authentication credentials from a key vault, one or more subnets to deploy the penetration test.

Figure 2:
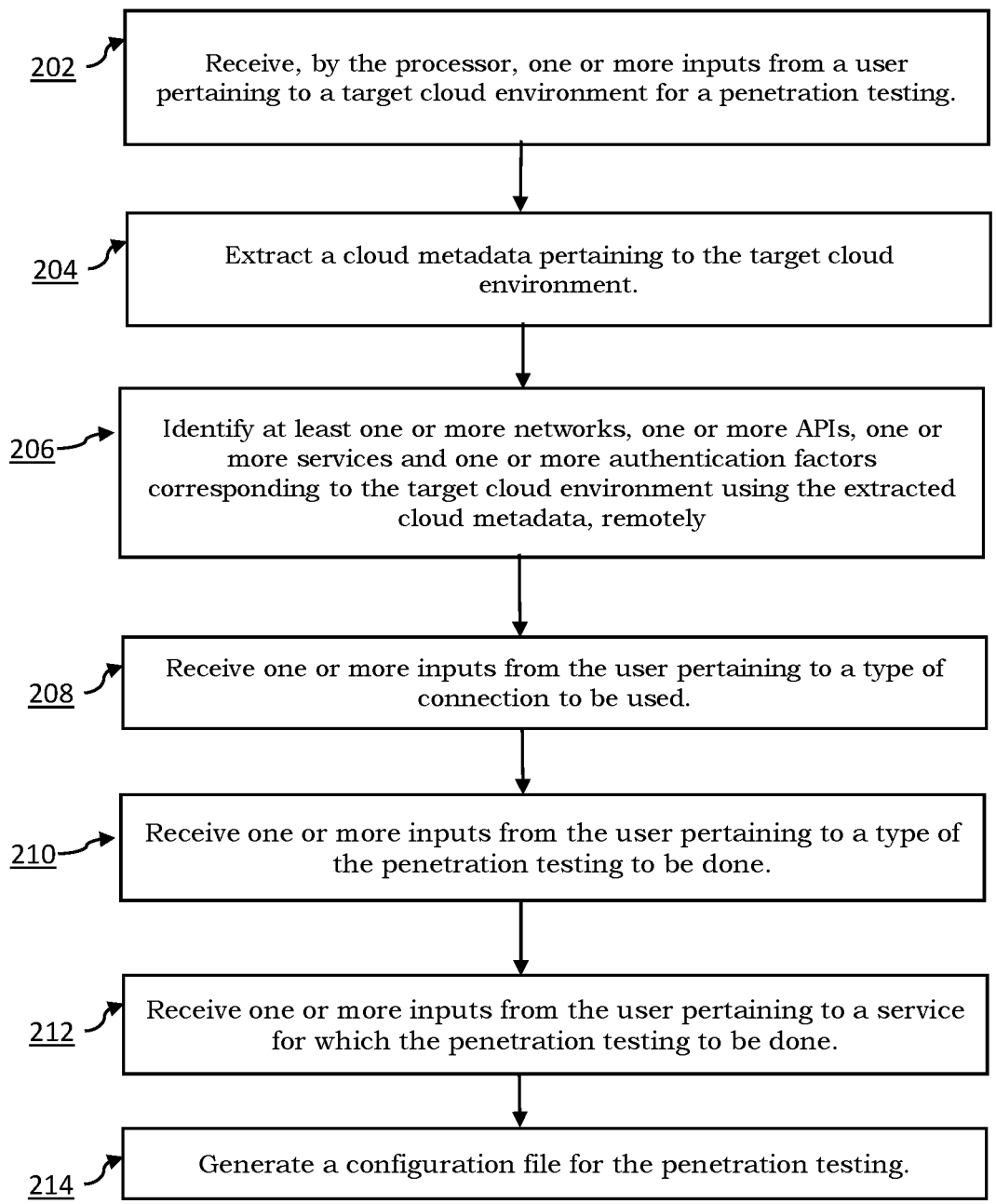
FIG. 2 is an illustration of steps and methods for automated penetration testing, in accordance with an embodiment of the present disclosure.

FIG. 2 depicts a preferred embodiment of a method for automated penetration testing for cloud, with the various units in operation. The method comprises method steps being executed by a being executed by a processor 102 communicably coupled via a communication network with a memory 104, a cloud 106 for penetration testing and a graphical user interface 108, using a non-transitory computer readable medium including program code, wherein upon execution the program code executes in an environment of computer systems providing method for automated penetration testing for cloud. At a step 202, the processor receives one or more inputs from a user pertaining to a target cloud environment for a penetration testing. At a step 204, a cloud metadata pertaining to the target cloud environment is extracted. At a step 206, at least one or more networks, one or more APIs, one or more services and one or more authentication factors corresponding to the target cloud environment using the extracted cloud metadata, is identified, remotely. At a step 208, one or more inputs from the user pertaining to a type of connection to be used. At a step 210, one or more inputs from the user pertaining to a type of the penetration testing to be done is received. At a step 212, one or more inputs from the user pertaining to a service for which the penetration testing to be done is received. At a step 214, a configuration file for the penetration testing is generated.

Figure 3:
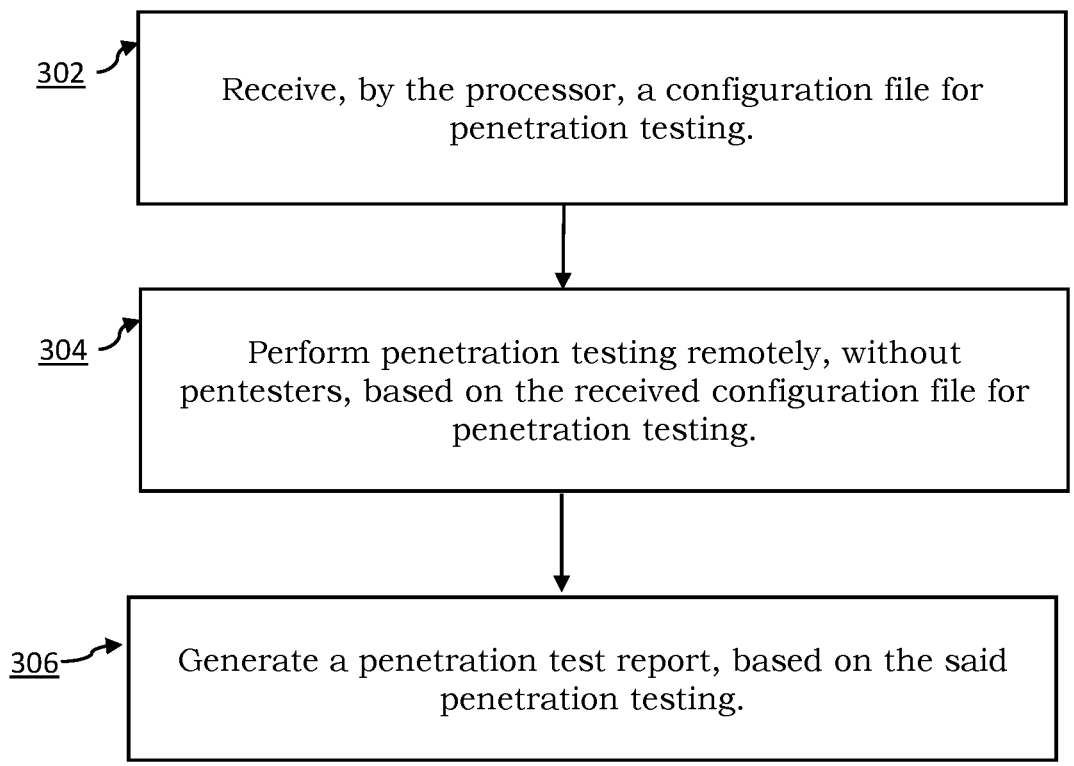
FIG. 3 is an illustration of steps and methods of performing automated penetration testing, in accordance with an embodiment of the present disclosure.

FIG. 3 depicts a preferred embodiment of a method for performing automated penetration testing for cloud, with the various units in operation. The method comprises method steps being executed by a being executed by a processor 102 communicably coupled via a communication network with a memory 104, a cloud 106 for penetration testing and a graphical user interface 108, using a non-transitory computer readable medium including program code, wherein upon execution the program code executes in an environment of computer systems providing method for automated penetration testing for cloud. At a step 302, the processor receives a configuration file for penetration testing. This configuration file may be the generated configuration file at a step 214 or an updated configuration file, which includes any modifications and updates added by the user. At a step 304, the processor performs extensive penetration testing remotely, without pentesters, based on the received configuration file for penetration testing. At a step 306, a penetration test report is generated based on the said penetration testing.

In a preferable embodiment of the present disclosure, the generated configuration file is a software code, configurable within a cloud deployment pipeline. Further, configuration file can be edited/altered by the user as well to incorporate any desired changes. This provides dynamic penetration testing as well. The processor is further configured to perform the penetration testing based on the generated configuration file, remotely, without pen-testers. The processor performs penetration testing of the target cloud environment, considering multiple scenarios and factors.

In another preferred embodiment of the same invention, the processor is further configured to generate a penetration test report based on the performed penetration testing to correlate against one or more desired cloud configurations. The findings of the generated penetration testing report identifies the network and security risks, potential vulnerabilities and attacks and other issues in the cloud. Further, the findings of the report are co-related against the cloud resource configuration to mitigate the identified risks. The user may go through the identified risks and can mitigate the same. Beneficially, the report is generated automatically, with minimum intervention from the user and without any pentesters. This makes it technologically advanced than the existing systems.

Various embodiments of the present invention validates the efficacy of security controls that mitigates including but not limited to the following identity and access related security misconfigurations: i Over privileged access policies; Unused credentials; Credentials in clear text. Further the system and method disclosed identifies including but not limited to the following network related risks: Open RDP, SSH, FTP, SMB ports; Over privileged endpoint policies.

Further the system and method disclosed identifies including but not limited to the following cloud storage related risks: Over-permissive storage policies; Anonymous access to public. Furthermore, the present disclosure disclosed identifies including but not limited to the following data encryption related security risks: Vulnerable TLS version; Unencrypted data and databases. It must be appreciated by a person skilled in the art that these risks being identified are not limiting the scope of the invention and the system and method is capable identifying all types of security risks associated with a network and a cloud.

In another alternate embodiment of the same disclosure, the system and method are integrated with Artificial intelligence and machine learning, wherein the processor learns the different systems and apply algorithms to identify the potential risks associated with it. False positives results are then fed back to improve the algorithm and thereby the system and method becomes efficient with every use.

In an alternative embodiment of the same invention, the said invention is integrated with a distributed ledger based platform such as a blockchain, as an alternative to the memory device. In this embodiment, the distributed ledger based platform is operable to store at least the user inputs, a threat metadata and the instructions to be executed by the processor and also the generated penetration test report. Further, the system and method may also be configured in such a manner so as to enable the system to be working automatically using smart contracts, on a redefined regular intervals. With the inherent nature of security integrated within a distributed ledger based platform, it makes the system and method more robust and secure. Furthermore, the system and method may also be configured to accept one or more types of cryptocurrency as payments to operate the system.

As an illustration of the working of the system, for example only, the user selects a particular Azure cloud for penetration testing. At the back end, the processor extracts metadata pertaining to the Azure Cloud selected and identifies one or more parameters related to the cloud for penetration testing. Parallelly, the system enables the user to enter few other details pertaining to the penetration testing. The user opts for an existing connection and enters the details of the same. The user is then enabled to enter the type of authentication and the authentication factors from a key vault, the type of penetration testing, i.e. external or internal, one or more subnets to deploy the penetration testing, one or more services on which the penetration test is to be performed. The user inputs can be supplied as a config file as well without manual internation. Based on the identified parameters from the cloud metadata and the one or more inputs from the user, the processor automatically, remotely, generates a configuration file as a code. Based on this configuration file, the penetration testing is done and a penetration test report is generated. The user can go through the report to understand and mitigate the vulnerabilities in the selected azure cloud.

Various embodiments of the present invention may also be implemented at different environments where cloud and network are being used. Alternatively, the system and method may be modified to perform penetration testing in other networks, applications, services, and software as well.

It shall be further appreciated by the person skilled in the art that the terms "first", "second" and the like herein do not denote any specific role or order or importance, but rather are used to distinguish one party from another.

Any examples or illustrations given herein are not to be regarded in any way as restrictions on, limits to, or express definitions of, any term or terms with which they are utilized. Instead, these examples or illustrations are to be regarded as illustrative only. Those of ordinary skill in the art will appreciate that any term or terms with which these examples or illustrations are utilized will encompass other embodiments which may or may not be given therewith or elsewhere in the specification and all such embodiments are intended to be included within the scope of that term or terms. Moreover, the words "example" or "exemplary" are used herein to mean serving as an example, instance, or illustration. Any aspect or design described herein as "exemplary" is not necessarily to be construed as preferred or advantageous over other aspects or designs. Rather, use of the words "example" or "exemplary" is intended to present concepts in a concrete fashion.

Modifications to embodiments of the present disclosure described in the foregoing are possible without departing from the scope of the present disclosure as defined by the accompanying claims. Expressions such as "including", "comprising", "incorporating", "have", "is" used to describe and claim the present disclosure are intended to be construed in a non-exclusive manner, namely allowing for materials, components or elements not explicitly described also to be present. Reference to the singular is also to be construed to relate to the plural.

Although an exemplary embodiment of at least one of a system and a method has been illustrated in the accompanied drawings and described in the foregoing detailed description, it will be understood that the application is not limited to the embodiments disclosed, but is capable of numerous rearrangements, modifications, and substitutions as set forth and defined by the following claims. For example, the capabilities of the system of the various figures can be performed by one or more of the modules or components described herein or in a distributed architecture and may include a transmitter, receiver or pair of both. For example, all or part of the functionality performed by the individual modules, may be performed by one or more of these modules. Further, the functionality described herein may be performed at various times and in relation to various events, internal or external to the modules or components. Also, the information sent between various modules can be sent between the modules via at least one of: a data network, the Internet, a voice network, an Internet Protocol network, a wireless device, a wired device and/or via plurality of protocols. Also, the data sent or received by any of the modules may be sent or received directly and/or via one or more of the other modules.

One skilled in the art will appreciate that a "system" could be embodied as a processor, a computer device integrated in a vehicle, a personal computer, a server, a console, a personal digital assistant (PDA), a tablet computing device, a smartphone, a virtual reality headset, or any other suitable computing device, or combination of devices. Presenting the above-described functions as being performed by a "system" is not intended to limit the scope of the present application in any way, but is intended to provide one example of many embodiments. Indeed, methods, systems and apparatuses disclosed herein may be implemented in localized and distributed forms consistent with computing technology.

The description, embodiments and figures are not to be taken as limiting the scope of the claims. It should also be understood that throughout this disclosure, unless logically required to be otherwise, where a process or method is shown or described, the steps of the method may be performed in any order, repetitively, iteratively or simultaneously. At least portions of the functionalities or processes described herein can be implemented in suitable computer-executable instructions. It will be appreciated that features of the present disclosure are susceptible to being combined in various combinations and additional features may be introduced without departing from the scope of the present disclosure.

The invention claimed is:

1. A system for automated penetration testing for a cloud, the system comprising:
   a processor;
   a memory containing executable non-transitory machine-readable instructions configured to instruct the processor to:
      receive, from a user, one or more inputs pertaining to a target cloud environment for penetration testing;
      extract a cloud metadata pertaining to the target cloud environment;
      identify, based on the extracted cloud metadata, at least one or more networks, one or more APIs, one or more services and one or more authentication factors corresponding to the target cloud environment, remotely;
      receive, from the user, one or more inputs pertaining to a type of connection to be used;
      receive, from the user, one or more inputs pertaining to a type of the penetration testing to be done;
      receive, from the user, one or more inputs pertaining to a service for which the penetration testing to be done;
      receive, by an artificial intelligence or machine learning module, the cloud metadata;
      identify, by the artificial intelligence or machine learning module, potential risks of the cloud;
      generate a configuration file for the penetration testing; and
      conduct, remotely, penetration testing based on the configuration file.

2. The system of claim 1 wherein the generated configuration file is a software code, configurable within a cloud deployment pipeline.

3. The system of claim 1 wherein the processor is further configured to perform the penetration testing based on the generated configuration file, remotely, without pentesters.

4. The system of claim 1 wherein the processor is further configured to generate a penetration test report based on the performed penetration testing, findings of which correlate against one or more desired cloud configurations.

5. The system of claim 1 wherein the processor is further configured to receive one or more inputs, from the user, pertaining to authentication credentials from a key vault.

6. The system of claim 1 wherein the processor is further configured to receive one or more inputs from the user, pertaining to one or more subnets to deploy the penetration test.

7. The system of claim 1 wherein the target cloud environment is one or more of Azure Cloud, Amazon Web Services, Google Cloud Platform.

8. The system of claim 1, further comprising:
   a distributed ledger-based platform that is operable to store at least the user inputs, threat metadata, instructions to be executed by the processor, and a generated penetration test report.

9. The system of claim 1 wherein the memory containing executable non-transitory machine-readable instructions configured to instruct the processor to:
   run penetration testing; and
   feed back false positive tests to the artificial intelligence or machine learning module to improve the artificial intelligence or machine learning performance.

10. The system of claim 1 wherein the one or more inputs pertaining to the target cloud environment for the penetration testing, the one or more inputs pertaining to the type of connection to be used, the one or more inputs pertaining to the type of the penetration testing to be done, the one or more inputs pertaining to the service for which the penetration testing is to be done, the one or more inputs from the user pertaining to the authentication credentials from the key vault, one or more inputs from the user pertaining to one or more subnets to deploy the penetration test are received using a graphical user interface.

11. A method for automated penetration testing for a cloud, the method comprising a plurality of electronic operations executed by a processor and a memory, the plurality of electronic operations including:
    receiving one or more inputs from a user pertaining to a target cloud environment for a penetration testing;
    extracting a cloud metadata pertaining to the target cloud environment;
    identifying at least one or more networks, one or more APIs, one or more services and one or more authentication factors corresponding to the target cloud environment using the extracted cloud metadata, remotely;
    receiving one or more inputs from the user pertaining to a type of connection to be used;
    receiving one or more inputs from the user pertaining to a type of the penetration testing to be done;
    receiving one or more inputs from the user pertaining to a service for which the penetration testing to be done;
    integrating with artificial intelligence or machine learning algorithms to improve the efficiency and accuracy of the penetration testing;
    generating a configuration file for the penetration testing; and
    conducting, remotely, penetration testing based on the configuration file.

12. The method of claim 11 wherein the generated configuration file is a software code, configurable within a cloud deployment pipeline.

13. The method of claim 11 comprising performing penetration testing based on the generated configuration file by the processor, remotely, without pentesters.

14. The method of claim 11 comprising generating a penetration test report based on the performed penetration testing by the processor, wherein findings of the generated penetration test report correlates against one or more desired cloud configurations.

15. The method of claim 11 comprising receiving one or more inputs from the user pertaining to authentication credentials from a key vault, by the processor.

16. The method of claim 11 comprising receiving one or more inputs from the user pertaining to one or more subnets to deploy the penetration test, by the processor.

17. The method of claim 11 wherein the target cloud environment is one or more of Azure Cloud, Amazon Web Services, Google Cloud Platform.

18. The method of claim 11, further comprising:
    integrating with a distributed ledger-based platform that is operable to store at least the user inputs, threat metadata, instructions to be executed by the processor, and a generated penetration test report.

19. The method of claim 11 wherein the type of the penetration testing to be done is one or more of external penetration testing, internal penetration testing.

20. The method of claim 11 wherein the one or more inputs pertaining to the target cloud environment for the penetration testing, the one or more inputs pertaining to the type of connection to be used, the one or more inputs pertaining to the type of the penetration testing to be done, the one or more inputs pertaining to the service for which the penetration testing is to be done, the one or more inputs from the user pertaining to the authentication credentials from the key vault, one or more inputs from the user pertaining to one or more subnets to deploy the penetration test are received using a graphical user interface.

* * * * *